United States Patent [19]

Gelhard

[11] Patent Number: 4,500,977
[45] Date of Patent: Feb. 19, 1985

[54] METHOD AND APPARATUS FOR MEASURING A DISTANCE USING ULTRASONIC ECHO SIGNALS, PARTICULARLY FOR USE ON A MOTOR VEHICLE

[76] Inventor: Egon Gelhard, Thomas-Mann-Str. 10, D-5000 Köln, 51, Fed. Rep. of Germany

[21] Appl. No.: 385,382
[22] PCT Filed: Sep. 24, 1981
[86] PCT No.: PCT/DE81/00153
§ 371 Date: May 25, 1982
§ 102(e) Date: May 25, 1982
[87] PCT Pub. No.: WO82/01256
PCT Pub. Date: Apr. 15, 1982

[30] Foreign Application Priority Data

Sep. 25, 1980 [DE] Fed. Rep. of Germany ....... 3036081

[51] Int. Cl.³ .................... G01S 15/18; G01S 15/93
[52] U.S. Cl. .................................. 367/108; 367/909
[58] Field of Search ........................ 367/108, 909

[56] References Cited

U.S. PATENT DOCUMENTS

| | | | |
|---|---|---|---|
| 3,742,434 | 6/1973 | Leyde et al. | 367/96 |
| 3,766,518 | 10/1973 | Rilett | 367/909 |
| 3,793,618 | 2/1974 | Plangger | 367/112 |
| 3,842,397 | 10/1974 | Sindle | 367/111 |
| 3,852,705 | 12/1974 | Backman, Jr. et al. | 367/95 |
| 4,015,232 | 3/1977 | Sindle | 367/111 |
| 4,240,152 | 12/1980 | Duncan | 367/108 |
| 4,278,962 | 7/1981 | Lin | 367/112 |
| 4,326,273 | 4/1982 | Vancha | 367/909 |

Primary Examiner—Richard A. Farley
Attorney, Agent, or Firm—Collard, Roe & Galgano

[57] ABSTRACT

A circuit for measuring and indicating the separation distance between a vehicle and adjacent obstacles, consisting of a pulse controlled ultrasonic generator, an ultrasonic transmit-receive transducer connected to the generator for transmitting direct ultrasonic pulse signals to distant obstacles, and receiving these signals that are reflected from the obstacles, an amplifier and detector circuit connected to the transducer output for amplifying the received pulse signals, a first comparator which is connected to the amplifier and detector stage, and a start-stop counter coupled to the output of the first comparator for measuring the difference in time between the end of the transmitted ultrasonic signal, and the reception of the reflected signal from the obstacle. There is also provided a noise suppression circuit coupled to the output of said first comparator and a second comparator coupled to both the output of the noise suppression circuit and the output of said start-stop counter. The start-stop counter begins its measurement of time used for determining the separation distance between the transducer and distant obstacles by beginning its measurement at the trailing edge of the transmitted pulse appearing in said receiver circuit.

9 Claims, 18 Drawing Figures

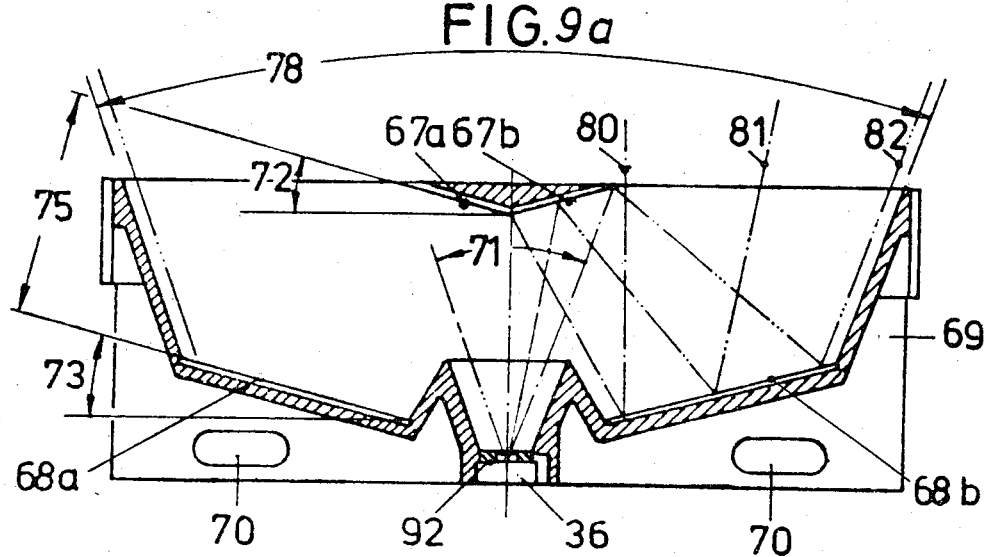
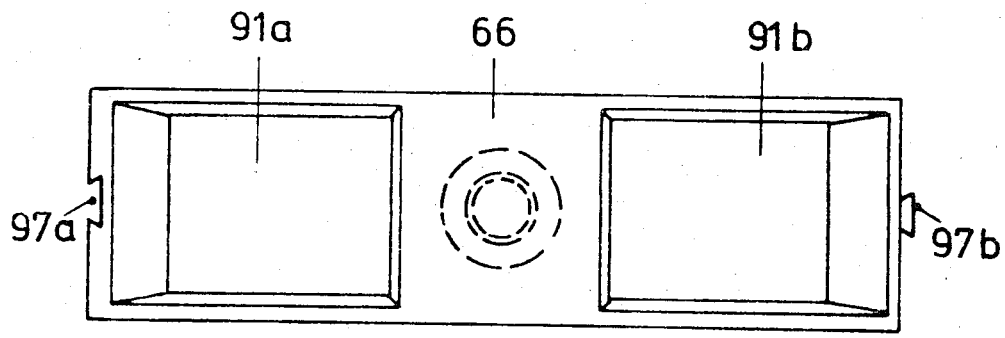
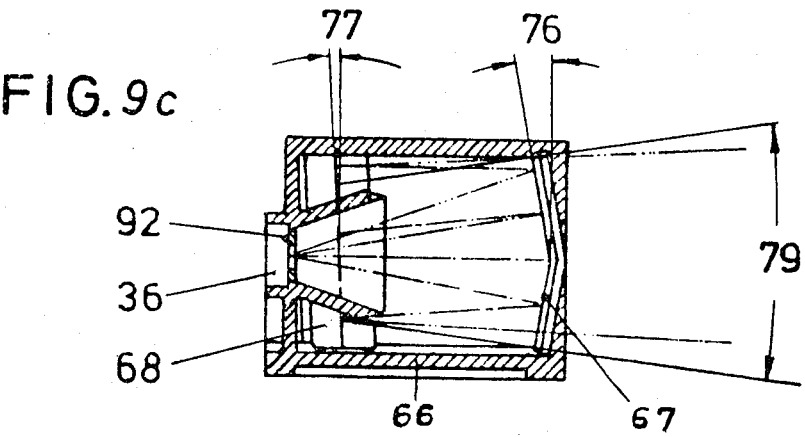

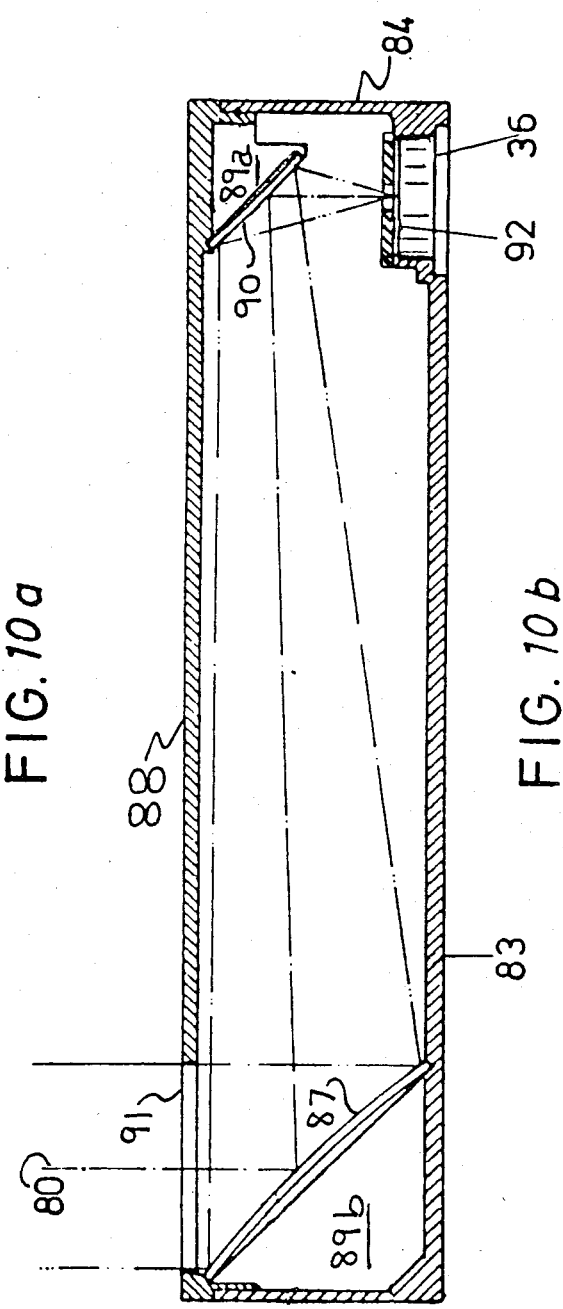

METHOD AND APPARATUS FOR MEASURING A DISTANCE USING ULTRASONIC ECHO SIGNALS, PARTICULARLY FOR USE ON A MOTOR VEHICLE

FIELD OF USE

The invention relates to a method for measuring a distance using ultrasonic signals. It also discloses a preferred switching arrangement as well as instruments for carrying out the method on a motor vehicle, such as private cars, buses, trucks, including trailers, tractors, pulling machines and motor-driven agricultural machines.

Other possible fields of uses are carts and construction machines, such as track-laying planers, loaders and graders as well as all cases involving narrow passages or borders which must be approached accurately.

Another field of use comprises heavy transportation vehicles, mobile cranes, fire fighting and ambulance vehicles as well as military vehicles, such as tanks, armored patrol cars and vehicles for the engineer corps, which make it impossible for the driver to see all contours of the vehicle and, therefore, always require a second man for "guidance".

OBJECT

It is the object of the present invention to provide a dependable, cost-effective installation which may be combined in a variety of ways to suit its use, with whose aid approaching distances from obstacles around the motor vehicle may be measured and indicated to the driver of the vehicle in digital, optical form and/or through acoustic warning signals, or which may selectively and optionally be used to actuate the operating elements of the motor vehicle, such as the gas pedal, the brake and the transmission.

STATE OF THE ART

In the measuring of distances by the ultrasonic (US) echo principle, it is known to emit US-signals produced by a US-frequency generator through a US-transmitter-receiver-transducer. The signals are received by the transducer after reflection from the object to which the distance is to be measured and transmitted to an electronic analyzer for indication, measurement and adjustment.

A great many different devices for receiving and analyzing the reflected signals have become known, which generally have means for counting the received pulses and indicating them in digital form.

Well known companies use open as well as closed ultrasonic transducers as sensors, most of which operate in a frequency range of 30 KHz to 600 KHz and which sometimes reach considerable sound capacities, measured as sound pressure at a predetermined distance and ranges.

They are primarily piezo-electronic sound transducers of ceramic material, such as lead zirconate-titanate, barium titanate, lead-meta-niobate or lithium niobate, in which the sensor, which mostly is pot-shaped, operates simultaneously as sender and receiver.

This is also possible with purely electromechanical transducers which primarily are constituted as plate-shaped oscillators, such as rod- or tube-oscillators.

Since 1978, the Siemens company produced a workable ultrasonic transducer (sensor) for echo sounding in the air, which is a combination of piezo-ceramic with a lamda-quarter-resonator of a novel robust bonding synthetic resin with an extremely low acoustic impedance and extraordinary properties. According to information received from the company, these sensors are not sold but are only used in company products!

Depending on the system and the structure and shape, these sensors differ with respect to their specific properties, such as the input voltage, the inner resistance, the capacity, the frequency range, the sound pressure, the degree of effectiveness, the range, the angle of the transmission and receiving channels and also the constancy of the medium in which they are to be used, such as air, gas or water, and the ambient temperature to which they are to be exposed, not the least also with respect to the sensitivity to dirt and precipitation, for example condensation of humidity in the air.

According to the state of the art, they are used in areas where light barriers are also used or where "wireless" signals are to be transmitted over shorter distances, for example control of a television apparatus by means of ultrasonic remote control.

For the purpose of targeted distance measurement in the transmission medium air, ultrasonic distance measuring systems have very recently become known in photographic apparatus, which after a short time of introduction have already attained a high level of technical precision.

CRITIQUE OF THE STATE OF THE ART

While these sensors, mounted on vehicles, are used for echo sounding to detect the presence, distance and movement of obstacles, very few piezo-electric sensors may be conditionally utilized with limitations because it is impossible to prevent contamination by dust, wetting by fog and rain, substantial temperature variations (tropical sun—polar cold), violent vibrations caused by the vehicle movement itself or shooting of a weapon and also purely mechanical damage of the membrane by foreign bodies raised from the street (gravel, leaves).

Moreover, since sensors with very small (narrow) emitting and receiving lobes are needed for the present use, the angle of the radiation lobe is determined essentially by the ratio of the wave length to the diameter of the membrane. Thus, membrane diameters of the order of magnitude of 50–80 mm are theoretically required at frequencies of around 35 KHz and angles of radiation lobes of less than 10 degrees.

With the combination of piezo-electric and plate oscillator properties, it may also be possible to obtain radiation lobe angles of less than 15 degrees at a membrane diameter of 25 mm but such sensors are presently excluded because of costs.

The known systems also leave much to be desired with respect of control, current supply and measurement of the pulse timing.

For example, closed transducers, which are the only useful ones, have the tendency of a long after-sound when they are operated at a high pulse voltage. Additionally, the after-sound time varies considerably when the temperature changes or even if the membrane is slightly dirty. In other words, the accuracy of the pulse travel time measurement and thus the distance measurement itself becomes inaccurate requiring the system to be continually calibrated.

Therefore, there are essentially six reasons why it is not advisable to use components according to the state of the art for the ultrasonic distance measuring system around a motor vehicle.

1. Large membrane diameters are required for small radiation lobe angles.
2. Combined sensor systems are sensitive and expensive.
3. Membranes of the transducers arranged in the direction of measurement are exposed to dirtying and damage.
4. Calculating the distance of the obstacle from the measurement of the time between the initial emission pulse and the arrival of the echo signal is too inaccurate because the times of the tranmission sound and the aftersound and the reception sensitivity for the echo signal depend on the temperature and the extent of the dirtying.
5. A minimum pulse travel time, which approximately corresponds to the pulse travel time of four times the width of the noise level, is needed in presently known and realizable systems to carry out exact, dependable measurements. That is, a distance measurement "distance almost zero" is not possible.
6. The switching structure for determining the pulse travel time is large and also expensive.

Problem:

The present invention has the object to provide a method, a switching arrangement and robust, dependably operating instruments for carrying out this method to provide a small and efficient system not only with a lower cost of the switching arrangement but also with the use of inexpensively obtainable integrated switching elements, particularly useful on vehicles for determining the distance of the vehicle from a fixed or movable object, one or more obstacles being possibly around the vehicle if transducers with corresponding ranges are mounted on the vehicle at corresponding positions and indicate the determined distance to the driver of the vehicle in digital, optical or acoustic manner and/or actuate the operating elements of the vehicle or are switched on by operating elements, for instance when going into reverse.

It should also be possible to control several sensors by a central unit, to analyze their measuring parameters and to indicate them, for example, on a single digital indicator, it being also desirable, for example, to adjust the tranmission of the acoustic warning signal in dependence on the distance or to switch over manually to select between a "far" and a "near range".

For the purpose of manufacture, the sensors finally should be able on the basis of the adjustability of the control electronics and of their mechanical structure to be mountable on various parts of the motor vehicle and, adapted to the respective mounting conditions, to adjust the magnitude and the position of the emitting and receiving lobe optimally.

Solution of the problem:

New paths in the fields of switching, analyzing as well as in the field of sensors have been taken to solve these problems.

SWITCHING AND ANALYZING FIELD

To solve the problem, a distance measuring method using the ultrasonic (US) echo principle is proposed according to the invention, wherein US-signals produced by a US-frequency generator are emitted through a US-transmitter-receiver-transducer, received by the said transducer after reflection from the object to which the distance is to be measured and are transmitted to an analyzing electronic for indication, measurement and adjustment, which is characterized in that the reflected US-echo signal is transmitted to the analyzing electronic only during adjustable gate times, the beginning of each gate time being derived each time from the direct emitted signal appearing at the end of the receiving channel.

Thus, the method of the invention does not operate by counting pulses but by opening an adjustable gate time. If there is an echo within this gate time, a preferably acoustic indication ensues.

The beginning of the gate time is always derived from the received signal, i.e. the gate time always begins automatically at the end of the direct emitted signal appearing in the receiving channel. Only each echo signal appearing thereafter is then analyzed.

In this way, an extended sounding of the emitted signal, for instance because of dirtying of the transducer, cannot cause a displacement of the direct emitted signal into the gate time. Without this automatic displacement of the gate time, undesired indications could appear due to temperature variations and/or dirtying of the transducer.

Furthermore, when closed transducers are operated at high pulse voltages, they have the tendency of producing after-sounds. In addition, these after-sounds are not always constant, i.e. different transducers have different sounding properties.

These disadvantages, too, can be taken into account with the method of the invention since the gate time only starts when the direct received signal has stopped sounding.

SOLUTION FOR THE SENSOR CONSTRUCTION AND THE MOUNTING

Generally, three types of sensors are required for the given requirement, first to encompass in a larger space farther removed obstacles, roughly in the range of 2 and 5 meters, such as the parking space, the height of a bridge passage, the lamp post in the middle of a yard, and secondly to be able to approach obstacles as closely as possible to a distance "zero" or a pre-selectable distance "X", for instance when reversing a tractor to enable the trailer axle to be attached or to drive in reverse for the accurate approach to a loading ramp:

Firstly: sensors with a large angle of aperture and a measuring range of about 0.3 to 5 m (Parkmaster).
Secondly: sensors with a small angle of aperture and a measuring range of 0.3 to 5 m (passage-height-gages).
Thirdly: Sensors with a medium angle of aperture and a measuring range of 0 to about 2 m (distance gage), i.e. sensors with "inner radiation path" of about 500 m, which requires one or more reversals.

However, the used types of sensors differ from each other in the measuring range (distance) and in the magnitude of the emitting and receiving lobe (angle of aperture).

In the distance range from about 0.3 m and up, the displacement of the zone of response, i.e. the range, in which an obstacle is seized and indicated, is obtained purely electronically by displacement of the gate time. Obstacles which lie ahead of, or behind, the distance equivalent to the gate time are not seized so that a selection of the obstacles is possible by displacing the gate time.

For the distance measuring range of from practically "zero" meter sensors are used which, according to the principle of hard sound deflection, deflect the sound beam in the sensor housing itself on two mirror faces, with the purpose that the sound beam has already passed through a sound path of about 0.5 m before it leaves the sensor housing, which corresponds to a pulse travel time and echo time of about 30 milliseconds so that there is a time span between the end of the sound of the tranmission pulse and the arrival of the echo signal in the always present noise level range, even if the obstacle lies immediately in front of the exit window of the sensor.

Depending on the space where this sensor is to be mounted on the motor vehicle, say in front centered ahead of the cooler grill, in the rear right and/or left below the loading platform, on the operating device of the construction machine or the agricultural device, different sensor housings with double mirrors with or without sound beam splitting are used so that sensor construction types with two exit and entrance windows but only a single transducer may also be used.

The reflection faces may consist of the same synthetic resin of which the sensor housing is usefully made, provided the surface may be made smooth and with a minimum hardness of 60 Shore. Otherwise, metallic and/or surface-treated "mirrors" may be used, plane mirrors (mirror faces), cylinder mirrors, prismatic mirrors, spherically convex or spherically concave mirrors being usable, depending on the space conditions where they are mounted and the required angle of aperture of the sound beam bundle which is emitted and reflected on the obstacle.

In optimizing the mirror and/or the mirror faces in shape, magnitude and position, it is always necessary to meet the requirement that the path of *all* ultrasonic beams emitted from the transducer has the same length to a given obstacle and back. This fundamental condition for a high measuring accuracy is obvious but its realization encounters difficulties in connection with a predetermined angle of aperture of the emitting and receiving lobe of the transducer and the required aperture and receiving angle of the exit and entrance windows of the sensor housing, which can be partly solved only with the aid of electronic computers by a stepwise optimization. This optimization has led to systems with beam splitting and double deflection on concave mirrors (mirror faces) which are oppositely staggered so that a beam path of "Z-shape" is produced, similar to the beam path of light in a prismatic telescope.

The requirement for an arrangement of the transducer in the sensor housing which is as protected as possible, also for sensors with a large angle of aperture and a measuring range from a distance of about 0.5. m has led by optimization to a sensor which is equivalent to a motor vehicle headlight without the headlight glass with respect to the system and the beam path, with a single reflection of the ultrasonic beam on a concave or parabolic mirror-like deflection face, the transducer proper, preferably a pot transducer, being emplaced instead of the light bulb, but with the essential difference compared to a headlight, not in or near the focal point of the system but adjustable in relation thereto displaced from the central axis and, additionally, arranged pivotally about horizontal and vertical axes.

With this arrangement, the energy-rich core of the emitted lobe does not impinge again on the transducer after reflection on the concave or parabolic mirror and the main emitting and receiving direction may be changed by rotation or pivoting of the transducer.

In addition, the sensor housing is provided with a guide track (for example, a T-profile or a dove-tail) which has its complementary part in the sensor holder so that the sensor housing itself may also be adjusted about a horizontal axis to a predetermined receiving direction and clamped in this position.

Thus, the optimal adaptation of the emitted and reflected ultrasonic beam lobe has substantial significance since, in each case, everything must be done to avoid reflections from the roadway and the ground or reflections from structural parts of the vehicle, such as projecting part, etc.

The solution of this adaptation problem with commercially available transducers, which frequently have too large a lobe aperture angle, is selectively found in three different measures, depending on the use of the sensors.

Solution a: An aperture of sound-absorbing soft rubber, which is applied to a carrier disc (metal, synthetic resin), is mounted directly on the membrane of the preferably pot transducer, the window defined by the aperture then defining the shape and angle of aperture of the tranmission and receiving lobe.

The solution is useful only for the simplest embodiments since the effective area of the transducer is cut whereby the obtainable measuring width and the reception sensitivity are markedly impaired.

For the transducer which operates directly without deflection on a reflection plane with a wide tranmission and receiving lobe, the widening zones of the tranmission lobe, which interfere mostly only in the direction of the roadway and the ground, are deflected obliquely upwardly by a rim projecting from the circumference of the transducer housing, a suitable shape of the rim making it possible to adapt the cutting of the widening zones to the respective mounting location.

For sensors for the measurement of passage heights, which have transducers mounted in a cylindrical housing with a conical funnel placed thereon, a bundling of the emitted ultrasonic lobe may be produced by selection of the cross sectional change of the funnel-shaped part, for example from round via oval to a rectangular cross section and, generally, holding the angle of the conus to the range between 3 and 10 degrees even in inexpensive piezo-transducers with wider widening lobe since, because of the small conus angle relative to the length of the conus, only one or two reflections can occur in the funnel itself.

For sensors in which the sound beam is guided similarly to the light beam in a headlight, the cutting of the sound widening zone, as described, may be effected by an aperture mounted thereon or, without impairing the reception sensitivity, analog to a rim by so cutting and/or widening the reflection area, which mostly has the shape of a quarter spherical cup, so that, for example, a range of the emitted lobe directed to the ground is deflected obliquely upwardly.

The solution for the total system consisting of an energy and control part (electronic), mounted sensors (transducers), operating part with built-in digital and optical and additional acoustic indicator as well as selsyns indicating the driving condition at the transmission of the motor vehicle looks as follows for an optimally equipped truck:

The energy and control part to be mounted in the driver's cab and to be connected to the battery of the vehicle is connected by a set of cables to the operating part mounted on the dashboard.

The two sensors on the front bumper (Parkmaster), the obliquely upwardly directed, funnel-shaped sensor mounted on the support arm for the rear view mirror for measurement of passage heights and the approach measuring sensors mounted in the rear left and right under the loading platform of the box structure are also connected with the energy and control unit by electrical, bifilar, screened conductors.

Long connections are needed in tractor-trailers or mounting of the distance measuring sensors on trailers so that special terminal stages with ultrasonic generators, passband amplifiers and rectifiers are built into the transducer housing.

A selsyn for the first speed and reverse are mounted on the transmission or the selector lever for an automatic transmission, the signal "reverse" being also derivable from the back-up lights. This selsyn is also connected by cable with the electronic control.

The system, which is connected in series with the ignition lock, is switched on by a switch on the operating part. The readiness state is indicated by a green light.

The three measuring systems, Parkmaster in front, passage height measuring instrument or rear approach measuring sensors, may be individually switched on and off by a selector switch on the operating panel.

In the "automatic" position, the Parkmaster is automatically switched on and off in first speed and the approach measuring sensors in reverse, and the operating readiness is indicated on a further signal lamp.

For the three operating states Parkmaster, passage height and approach-in-reverse, basic parameters may be set on four three-digit decade selector switches, that is the general response distance for the approach sensors, response distance "wide" and response distance "near" for the Parkmaster, the effective loading height of the vehicle above the roadway in dependence on the load, weight and possibly the tire pressure for the passage height measuring system.

If the respectively set parameter has been reached in one of the four operating states, the optical warning signal "large red lamp" is emitted and if falls further below the set parameter, the acoustic warning signal and the actuation of the air pressure brake system.

In position "out", all optical, acoustic warning signals are eliminated and the brake system is released again.

With respect to the device, the following special embodiments of the transducer of the acoustic indication and the simple distance setting may be effected.

For example, an improvement of the oscillatory properties of the transducer in the above-described switching arrangement may be obtained by a special additional inductive switching means.

Through a special construction of the closed US-transducer as transmitter and simultaneously as receiver, its mechanical and electrical oscillating state may be such that a particularly favorable physical/acoustic property is attained, namely a radiation angle of about $2 \times 80°$.

Of course, a digital start-stop frequency counter with optical indication for indicating the distance of the object within the measuring range down to an accuracy of centimeters may be provided.

The acoustical indication may be made by a permanent constant signal as long as the object remains within the set range and within the gate time while the optical indication continuously gives the actual distance, independent of the set gate time, by the additional counter to be connected.

A simple distance setting may be effected by changing the gate time in two stages which may be adjusted independently of each other by a potentiometer. The first stage for the large distance is switched on after the device has been switched on by actuation of the reverse drive and is adjustable between about 0.5–2 m. The second stage is switched on only by a push button and may be adjusted between about 0.3–1 m. After the device has been switched off and on again, the first drive speed is always switched on to that no operating mistakes can occur. The device may be very simply connected with the transducer by connecting it to the back-up light.

The tranmission of a short acoustic stop signal can be readily achieved with the switching on of the device with optical indication, for instance by a green LED which is used for switching stage 1. This produces also an operating control. When the push button switches on "short distance" (switching stage 2), an additional red LED may be provided. In this way, the respective set switching stage (distance) may always be read on the operating/control part.

The connection of several sensors to a central device may be done in a modular construction so that the width of the range may be increased, particularly for commercial vehicles, trucks, trailers, vans, etc. If several sensors are connected, the respective shortest distance counts always for the acoustic signalling.

FURTHER EMBODIMENT OF THE INVENTION

As has been explained in the section about the fields of use, the subject matter of the invention may be used in vehicles of all kinds and in all cases where an approach of vehicles, vehicle structures, devices of vehicles to an obstacle hidden from direct view of either desired or not desired.

For example, the approach measuring system offers an extraordinarily valuable aid to the driver of a truck when he uncouples a standing trailer which he must approach as he drives in reverse accurately to the "length of the shaft".

In modern large truck-trains with a short distance between the tractor and trailer structures, large ground unevenness and sharp curves may cause damages of a substantial nature. An approach measuring system mounted between the vehicle structure and the trailer structure may provide a timely warning here.

In loading large containers, positioning and placing to an accuracy of centimeters is required, for which the subject matter of the invention can be irreplaceable.

Advantages that can be obtained:

1. The great personal and property damage so frequently encountered during a "blind" drive in reverse can be fully avoided by the arrangement of the subject matter of the invention on a truck and bus.

2. The passage height measuring system constitutes an effective protection for vehicle and bridge, and it can help to reduce a bridge collapse of grave consequence by contacts with the load.

3. The Parkmaster is an indispensable instrument of orientation for all motor vehicles, particularly under present-day inner-city parking situations.

4. The aid during accurate reverse driving towards loading ramps and/or standing trailer vehicles shortens the operating time and thereby increases the extent of the use of the vehicles.

5. The electronic system, which does not use the conventional pulse travel time measurement but operates with a freely selectable gate time, is simple in construction, operates dependably, universal and inexpensive to manufacture.

6. The described sensor structure with a single sound deflection on a concave or parabolic mirror segment permits for the first time the use of a piezo-electric pot transducer as distance and approach sensor on the motor vehicle.

7. The sensors with double sound deflection within the sensor housing offer for the first time the possibility to measure an approach distance "zero" ultrasonically.

8. One or more sensors for different tasks may be selectively connected to a central energy and control unit.

9. The possibility of changing the adjustable fundamental parameters on the operating part enable the system to be adpated to different load conditions and traffic situations.

10. The narrowing of the tranmission and reception lobe angle on piezo-electric pot transducers by placing a sound-absorbing aperture with an adaptable aperture window constitutes a simple, effective measure for the use of inexpensive transducers with a wide lobe angle in applications which require a narrow bundling of the tranmission and reception lobe.

DESCRIPTION OF EXEMPLARY EMBODIMENTS

Preferred mounting and circuit arrangements and devices for carrying out the method of the invention are described in drawings 1 to 5.

The arrangement of the devices, which is possible for the multiple use of the method on the motor vehicle, on *one* motor vehicle and five different emitting and receiving devices in their respective structural embodiment adapted to each respective application are shown in drawings 6 to 10.

Figure 6A:
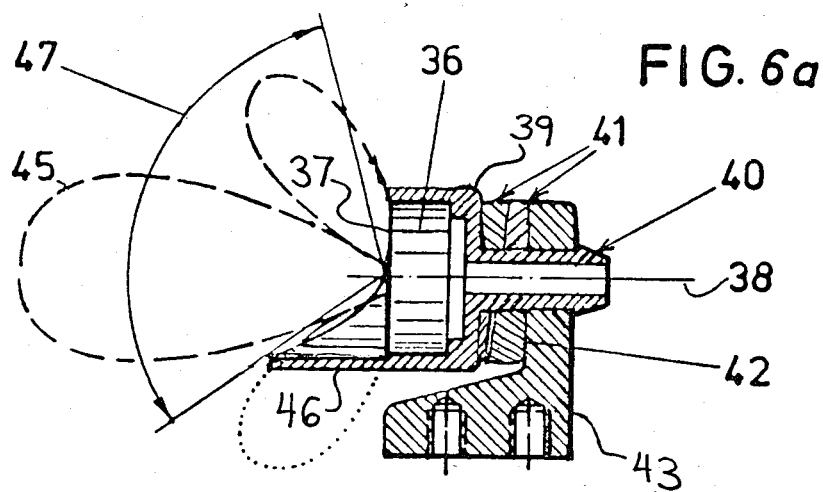

In these drawings,

FIG. 6a shows a vertical section through a sensor used primarily for measuring parking spaces.

Figure 6B:
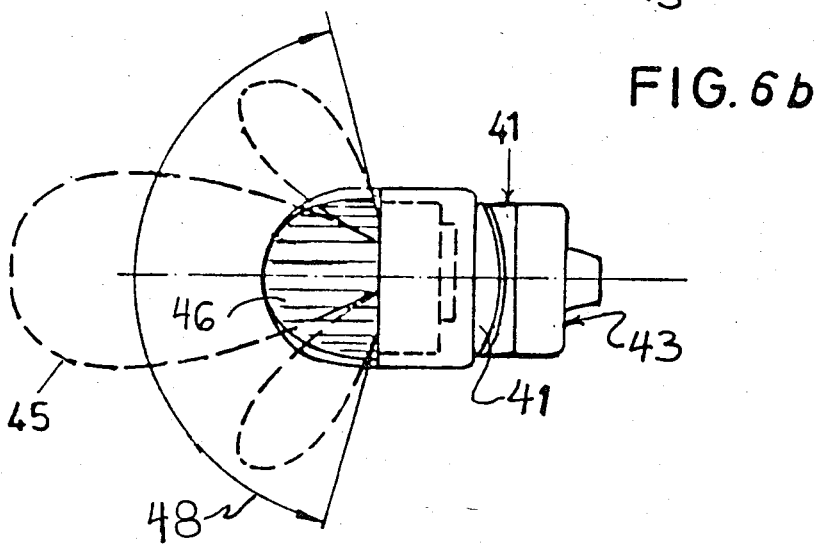

FIG. 6b shows a top view of the device of FIG. 6a.

Figure 6C:
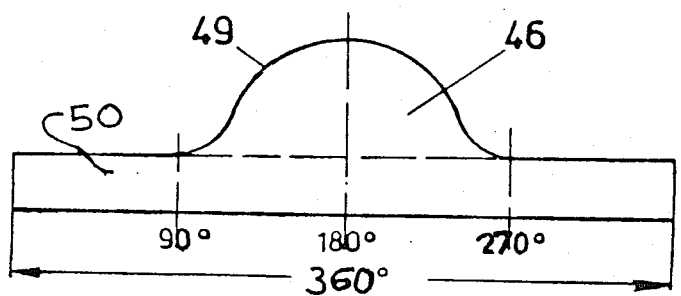

FIG. 6c shows the development of the screening of the device of FIG. 6a.

Figure 7:
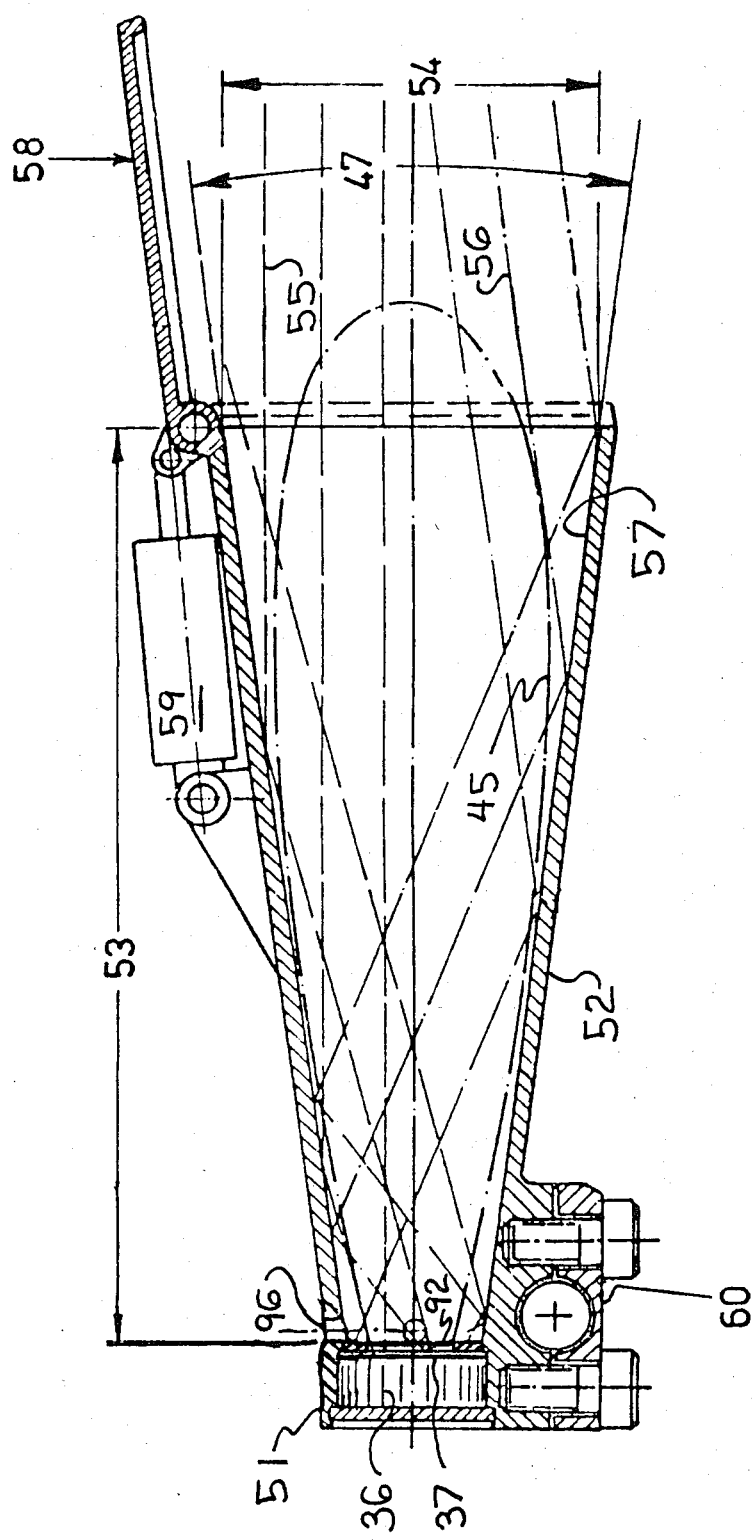

FIG. 7 shows a vertical section through a funnel-shaped ultrasonic emitting and receiving device without sound deflection, as it is used primarily for measuring passage heights.

Figure 8B:
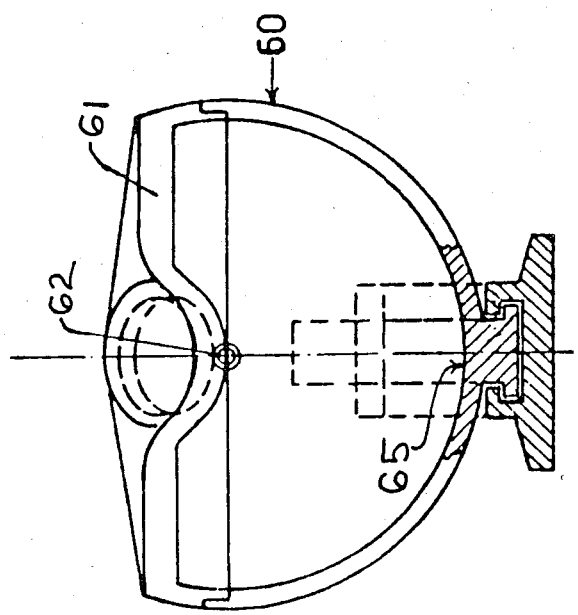
Figure 8A:
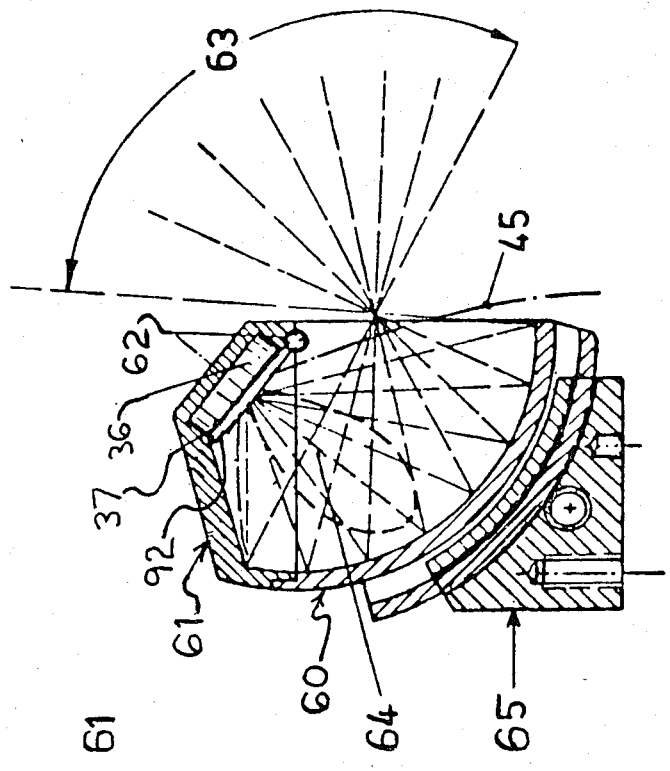

FIG. 8a shows a vertical section through a concave mirror ultrasonic emitting and receiving device with a single sound deflection, as it is used primarily for seizing large obstacles.

FIG. 8b shows a front view of the device shown in FIG. 8a.

FIG. 9a shows a horizontal section of a box-shaped ultrasonic emitting and receiving device with double sound deflection, as it is used primarily for measuring an approach to a few millimeters.

FIG. 9b is a front view of the device shown in FIG. 9a.

FIG. 9c shows a vertical center section of the device shown in FIG. 9a.

FIG. 10a shows a horizontal section of a flat, elongated ultrasonic emitting and receiving device with double sound deflection for measuring an approach to a few millimeters in crowded mounting conditions.

FIG. 10b shows an elevational view of the device shown in FIG. 10a.

Figure 11A:
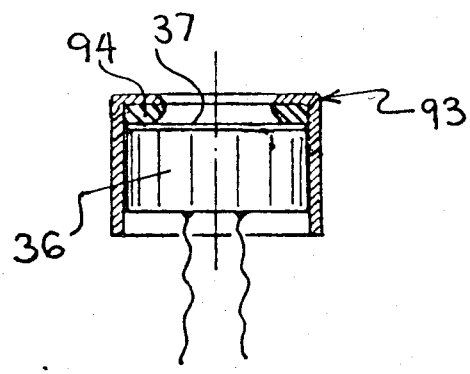
Figure 11B:
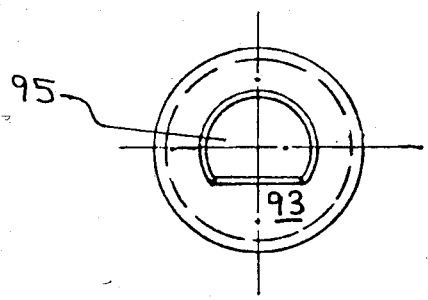

FIGS. 11a and 11b show a cross section and top view of an aperture placed on an ultrasonic transducer.

Figure 1:
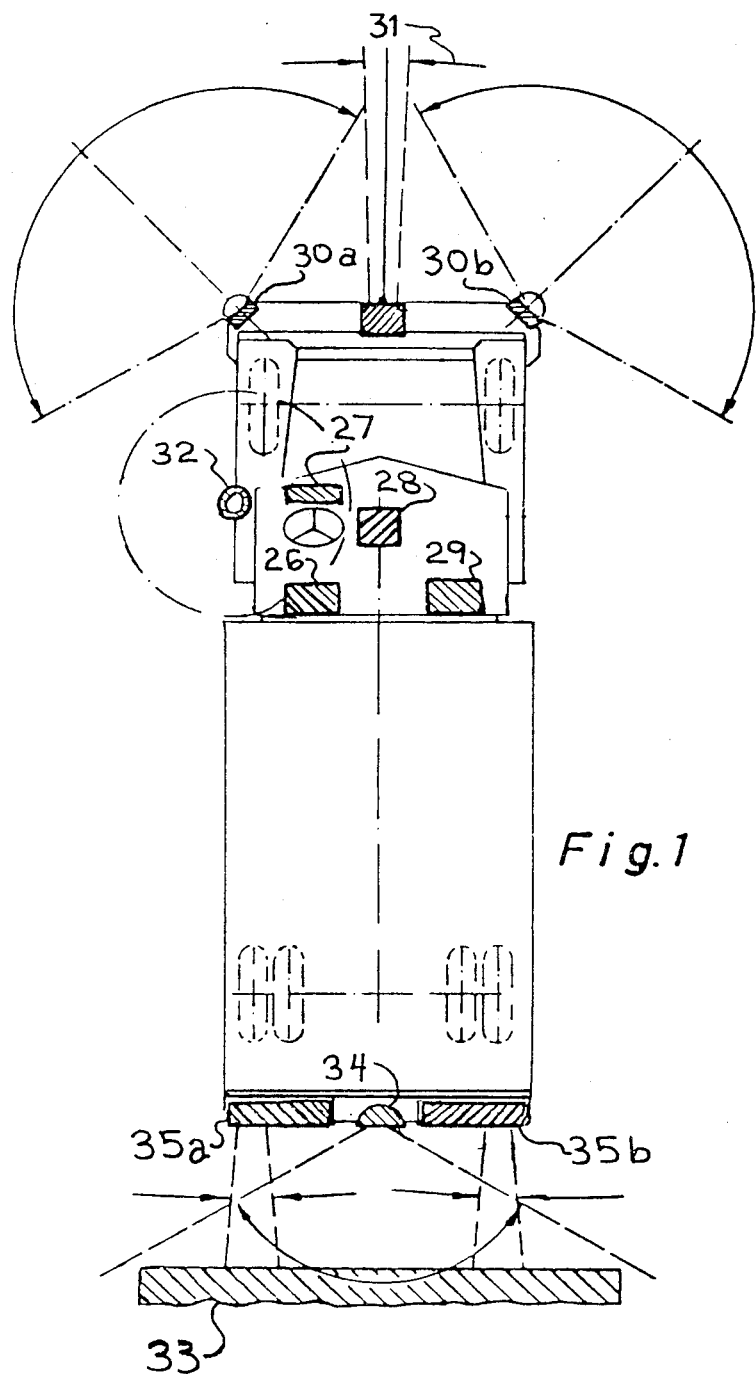
FIG. 1 shows generally the mounting of the devices, by way of example, on a truck (schematic).

As is shown in FIG. 1, central unit 26, the digital indicator with operating elements 27 and a switching position adapter vehicle transmission 28 arranged in the driver's cab may be connected to vehicle battery 29, for example of a truck.

As optimal equipment, a total of seven US-transmitter-receiver-units are mounted on the truck (called sensors hereinafter). This includes two wide-beam sensors 30a and 30b mounted on the ends of the front bumper and having directly impacted sensor membranes and a reflecting angle of about 150 degrees in the horizontal and about −5 to +80 degrees in the vertical and a response range of about 5 m to 30 cm so that driving into a narrow gate and/or towards obstacles (posts) is greatly facilitated (sensors according to FIG. 6).

A sensor 31 (according to FIG. 9) with double deflection is mounted centrally on the bumper, on the cooling grid or the front hood, which is capable of handling an approach up to about 1 cm and indicating it on the digital indicator because of its inner sound wave length of about 500 mm.

Passage height measuring sensor 32 is mounted on the support arm of the right rear view mirror, which has a narrow focus of less than 10 degrees and is so mounted inclined with respect to a horizontal axis extending perpendicularly to the longitudinal axis of the vehicle that it can selectively measure obstacle distances just ahead of the vehicle or accurately below the vehicle. The adjustable, predetermined height of the vehicle is then deducted from the measured parameter in the central control unit and the difference, if positive, is then digitally indicated as passage height reserve or, if negative, is used to actuate the acoustic and/or optical warning device, the lacking passage height also being visibly indicated on the digital indicator.

The use of the system is particularly helpful in reverse drive and on an approach to a loading ramp 33.

A wide-beam-concave mirror-sensor 34 with single sound path deflection is mounted at the rear, centrally under the loading surface of the platform or the box structure, which takes in obstacles within a measuring range between 5 and 0.5 meters with its large emitting and receiving angle of 150 degrees in the horizontal and −5 to +80 degrees in the vertical, and may optionally show it on the digital indicator (sensor according to FIG. 8).

For an approach of the loading surface to the ramp to a few centimeters, two rear-measuring sensors 35a and 35b are also mounted below the platform floor or the loading surface of the box structure at the left side and the right side, which can handle distances (approaches)

down to 1 cm and indicate them with an inner sound path of about 500 mm (sensor according to FIG. 10).

Figure 2:
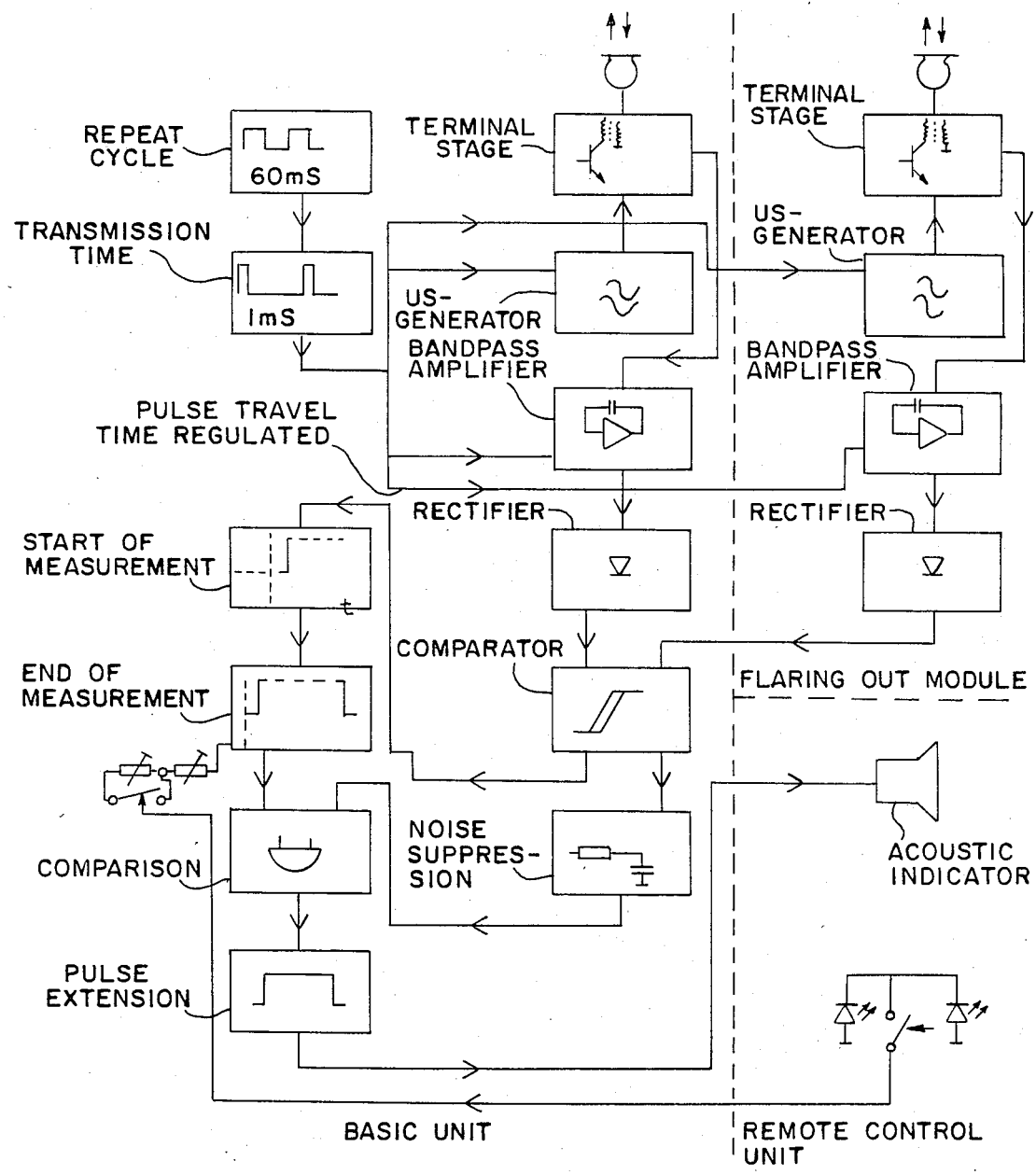
FIG. 2 shows a block diagram of a circuit arrangement for the device for carrying out the method of the invention.

FIG. 2 is a block diagram showing the principle of the construction of the system. A US-generator, which is connected to a terminal stage and a US-transmitter-receiver-transducer W, is controlled with a repeat cycle of 60 mS and an tranmission time of 1 mS. The terminal stage is connected via a passband amplifier and a rectifier to a comparator whose outputs are connected with circuit arrangements for the start of the measurement and the end of the measurement as well as the suppression of noise.

Both circuit arrangements lead to a comparator and a pulse extender whose output is connected with the acoustic indicator. A remote control may be connected to the circuit arrangement for the termination of the measurement.

A second US-generator is controlled with the same repeat cycle and tranmission time and leads to a plug-in module which is constructed in the same manner and is also connected to the comparator.

Figure 3:
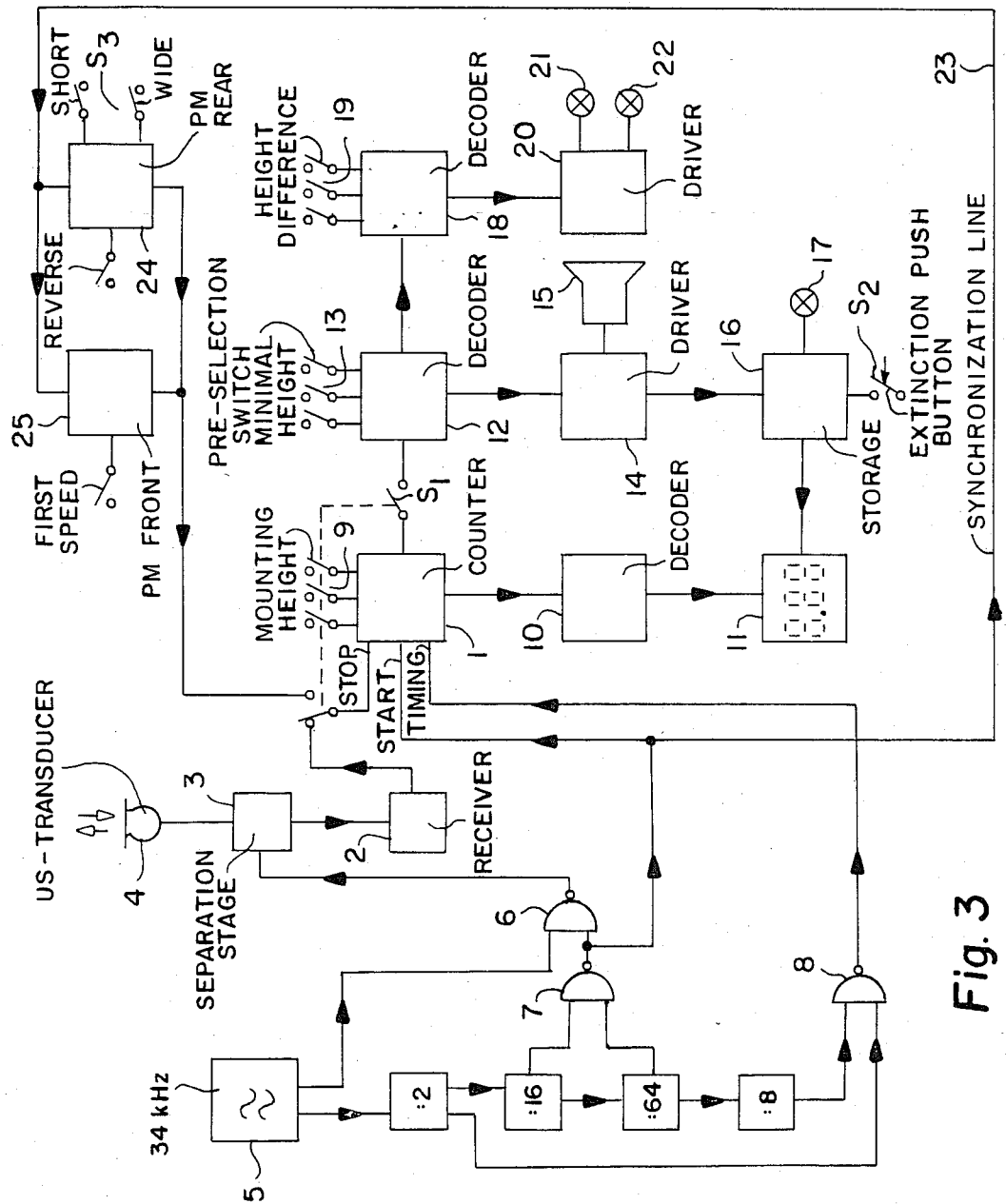
FIG. 3 shows a block schematic of a circuit arrangement for several sensors.

As can be seen from FIG. 3, a block circuit diagram for an enlarged system, the circuit arrangement according to the invention consists essentially of start-stop counter 1 whose stop input is connected via receiver 2 with separating stage 3. US-transmitter-receiver-transducer 4 is connected to the input of the separating stage.

The separating stage, furthermore, is connected via a frequency divider-gate arrangement with an h-f generator 5 which produces about 34 kHz.

The frequency divider-gate arrangement consists of a first divider :2, a second divider :16, a third divider :64 and a fourth divider :8. The output of h-f generator 5 is connected, on the one hand, to first gate 6 and first frequency divider stage :2.

The output of a second NAND gate 7 is connected with the second input of NAND gate 6 and, at the same time, emits the starting pulse at the start input of counter 1. The two inputs of NAND gate 7 are connected to the outputs of second divider :16 and third divider :64. The output of fourth divider :8 as well as the output of first divider :2 are connected to the two inputs of a third NAND-gate 8 whose output is connected to the timing input of counter 1. Furthermore, a circuit arrangement 9 for fixing the mounting height of the probe is provided at counter 1. The counter is connected via decoder 10 with a digital indicator device 11. Furthermore, counter 1 may be connected via switch S1 with a second decoder 12 on which switch 13 for the pre-selection of the minimal height is arranged. Decoder 12 is connected with driver 14 and acoustic indicating device 15.

The output of driver 14 is connected with storage 16 which has extinction button S2. Optical indicator 17 indicates the state of storage 16.

Decoder 12 furthermore is connected with another decoder 18 which has a circuit 19 for setting the difference in height. Decoder 18 is connected with a further driver 20 which is connected with two indicator lamps 21 and 22.

Two US-distance measuring devices 24 and 25 are connected to the conductor for the start of counter 1 via synchronous conductor 23, as has been described in connection with FIGS. 2 to 3 and which enables, for example, accurate and dependable parking of the vehicle. These distance measuring devices may, for example, be switched on by the drive speed selection system and may also have switching arrangement S3 with which they may be adjusted to a short or a long distance.

Figure 4:
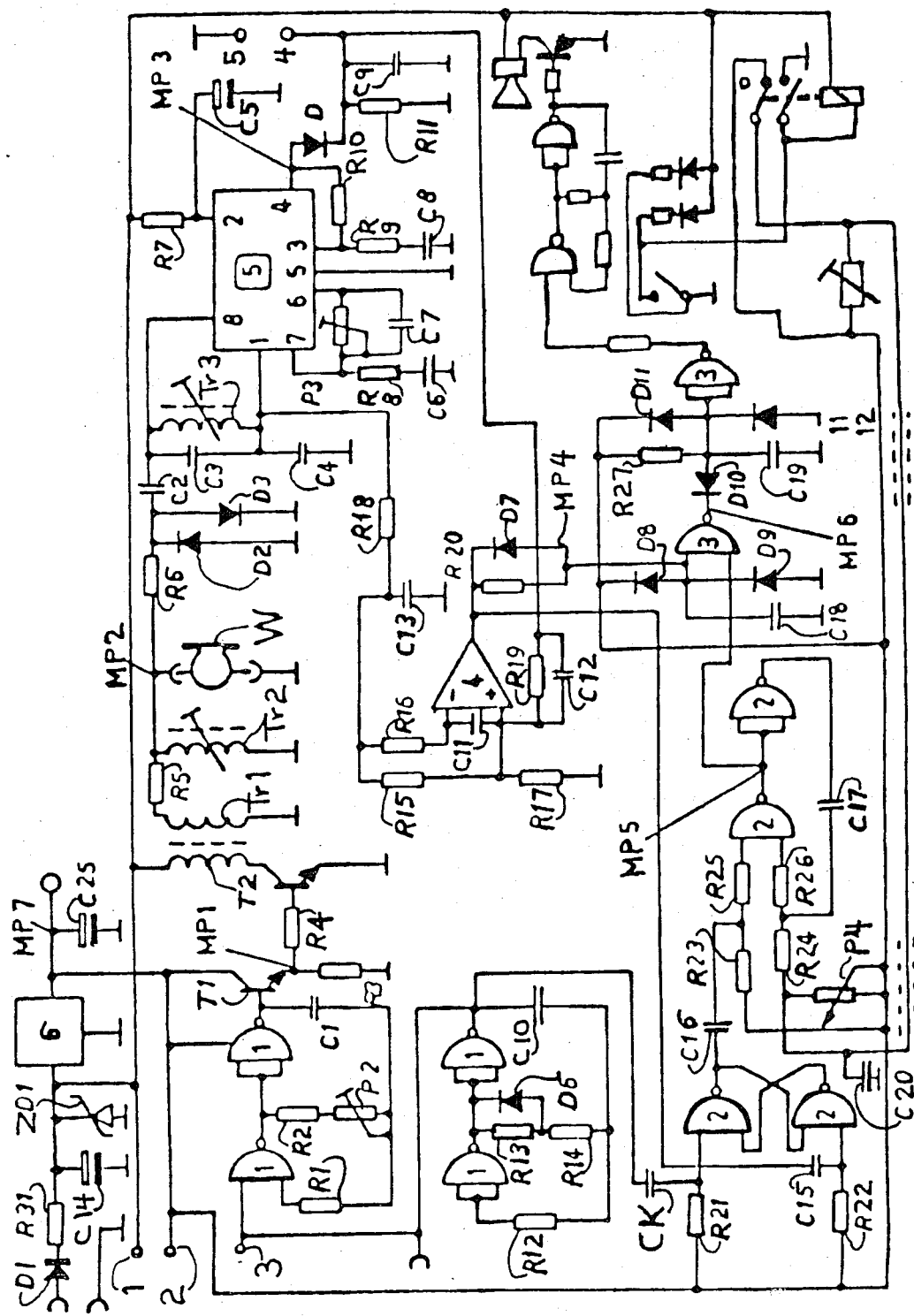
FIG. 4 shows a detailed circuit arrangement of the switching diagram-in-principle of FIG. 2.

As can be seen from FIG. 4, which shows a general circuit diagram of the system, an astable multivibrator constituted by two gates of IC-1 with unequal pulse-pause conditions produces 1 mS-pulses with a 60 mS duration of the pause. These pulses control a similarly constructed second astable multivibrator which works on the frequency of transducer W so that a signal lasting 1 mS and having the frequency of the transducer is generated at its output every 60 mS. The exact transducer frequency may be set with P2.

A trigger pulse for the external synchronization, for example of the second plug-in module, can be taken off the output of the first multivibrator.

The h-f signal is amplified and is transformed to 120 $V^{ss}$ and is radiated from transducer W. Transformer TR1 is a wide-band transmitter and transformer TR2 is tuned to the transducer frequency.

All echo signals received from the same transducer are transmitted via R6, C2 to the selective input circuit of h-f amplifier IC-5 which is resistant to override. Limit diodes D2-D3 prevent too large an input voltage at the amplifier.

The echo signals are converted in comparator IC-4 after rectification and screening into rectangular signals of constant amplitude and are transmitted to screening member R20-C18.

The threshold of the comparator is derived from the working point stabilization of the h-f amplifier.

After pulses which are too narrow are suppressed in the screening member, the echo signals arrive at the comparator (first gate of IC-3). This always delivers a negative actuating signal to the indicator part when an echo passes through the measuring window.

This measuring window is produced by a monoflop (IC-2) whose timing may be set by P1 at 0.1-15 mS. This time constitutes the end of the window and is, at the same time, the distance adjustment.

The beginning of the window is predetermined by the R-S flip-flop (left gate of IC-2). This is always triggered when the return signal at transducer W dies out and is reset by the synchronous pulse at the end of the tranmission signal. This assures that the measuring window never is opened when the receiving amplifier receives an emitted signal which has not yet died out.

The actuating signal is extended with R27-C19 and after amplification is transmitted to the output. By plug-in 4-pole cable, the extended actuating signal operates tone generator To contained in the remote control, which is connected via an amplifier with the loudspeaker. The extension of the actuating signal assures that the acoustic indication always has a minimum duration.

The non-amplified pulse transmission package of the length of 1 mS can be examined at measuring point MP1.

The emitted h-f ultrasonic signal is received at measuring point MP2.

The unshaped h-f reception signal can be sensed at measuring point MP3.

The shaped reception signal can be controlled at measuring point MP4.

The window size may be sensed at measuring point MP5.

The actuating signal is still available to the comparator at measuring point MP6.

The stabilized operating voltage can be monitored at measuring point MP7.

Figure 5:
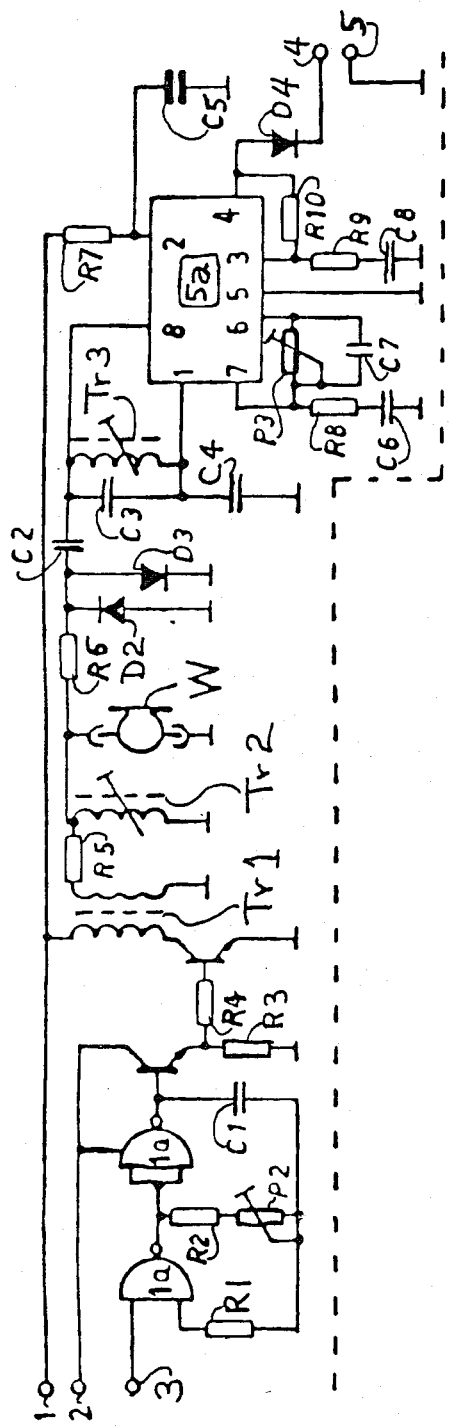
FIG. 5 shows a detailed circuit arrangement of a supplemental plug-in module according to FIG. 4.

The plug-in module shown in FIG. 5, which has been illustrated in block diagram form in FIG. 2, consists of a second multivibrator-tranmission amplifier, reception amplifier and rectifier, which are identical with the fundamental unit described in connection with FIG. 4.

The second multivibrator is synchronized with the synchronizing pulse at point 3 of the central electronic. The rectified echo pulses are delivered at point 4 and the voltage delivery at the plug-in unit comes from point 1-2-5.

FIG. 6a shows a simplified vertical section, not at scale, of a US-transmitter-receiver-sensor with direct impingement, whose ultrasonic detector 36 with its transmitter and receiver membrane 37 and its connection lines 38 being placed in a pot-like housing 39 of weather-resistant synthetic resin. Two discs 41, which are not parallel to each other, are placed on bored mounting pin 40 and, by rotating them relative to each other in connection with the perpendicular contact face 42 of holder 43, center axis 44 of the system may be horizontally and vertically oriented.

The magnitude of the emitting and receiving range, which initially is determined by the extent of the emitting and receiving lobe 45 of the detector, is so limited by rim 46 at the outer diameter of the housing that an emitting and receiving range in the vertical according to vertical angle of aperture 47 results.

FIG. 6b shows a top view of the sensor according to FIG. 6a and indicates horizontal angle of aperture 48.

FIG. 6c shows a typical development contour 49 of rim 46 which is integral with the mantle of housing 50.

FIG. 7 shows a simplified cross section, not at scale, through a US-transmitter-receiver-sensor with a funnel-shaped attachment for the distance measurement with a very narrowly effective receiving and emitting lobe 45. Cylindrical synthetic resin housing 51 flares out into funnel 52 whose effective length 53 with its angle of aperture 54 is so adapted that ultrasonic waves 55 impinging parallel to the funnel axis and reflected on the obstacle or sound waves 56 impinging obliquely to the funnel axis are not often reflected again on inner funnel wall 57 before they impinge on membrane 37 of ultrasonic detector 56.

For protection against the weather, the funnel is closed during the down-time by cover 58 which is moved by electromagnet 59 or a non-illustrated pneumatic actuation. The US-passage height measuring sensor may be affixed to the support arm of the outside rear view mirror, for example, by clamping device 60.

At least two bores 96 are provided at the base of the conical funnel, which are positioned in different zones of the driving wind pressure, due to their different positioning on the circumference, so that membrane 37 of transducer 36 is free of dust or humidity deposits.

FIG. 8a shows a simplified cross section, not at scale, through a US-transmitter-and-receiver sensor embodied in a concave mirror with a single deflection of the emitted sound waves and of the sound waves reflected from the obstacle.

For purposes of manufacture, the housing has two parts and consists of quarter-spherical reflector 60 and attachment 61 which receives ultrasonic detector 36. The effective spreading direction 63 of emitting and receiving lobe 45 is optimized by suitable selection of the position of the emitting and receiving membrane with respect to reflector center point 62, with the result that only in energy-rich core 64 of the lobe is oriented, emitted and received.

The housing may be adjusted, fixed and mounted in, and with, clamping holder 65.

FIG. 8b shows a front view of the concave mirror sensor shown in section in FIG. 8a (emitting and receiving direction).

FIG. 9a shows a simplified horizontal section, not at scale, through a US-transmitter-receiver-sensor with double sound reflection to produce an inner constant sound path length of about 500 mm.

The housing consists of box 66 which receives ultrasonic detector 36, front reflecting face 67 and rear reflecting face 68, and which may be mounted on the vehicle by means of flanging 69 and fixing holes 70.

Several housing boxes may be assembled directly by means of dove-tail plug-in connection 97.

The vertical exit angle 78 and the horizontal exit angle 79, the interior sound path length, illustrated by lines 80, 81, 82, may be held to the same length by optimal adaptation of funnel angle 71, vertical angle 72, the front reflection face (mirror), vertical angle 73, the rear reflection face and mirror spacings 74 and 75 in connection with horizontal angle 76 of the front reflection face, illustrated in FIG. 9c, and horizontal angle 77 of the rear reflection face.

FIG. 9b shows an elevational view of the sensor according to FIG. 9a in the emitting and receiving direction.

FIG. 9c shows a simplified cross section, not at scale, through the sensor according to FIGS. 9a and 9b.

FIG. 10a shows a simplified cross section, not at scale, through a US-transmitter-receiver-sensor with double sound reflection on convex mirrors in elongated, flat shape with equal sound path lengths.

The housing consists of synthetic resin box 83 with receptacle 84 for ultrasonic detector 36 whose outwardly flaring lobe 37 is limited by funnel-shaped aperture 85 of foam material and holder 86 for large convex mirror 87 as well as housing cover 88 with mirror receptacle 89 for small convex mirror 90 and inlet window 91.

FIG. 10b shows the sensor according to FIG. 10a in front view in the emitting and receiving direction.

FIG. 11a shows a simplified cross section, not at scale, through ultrasonic transducer 36 on whose membrane 37 an absorber disc 94 is placed, which is applied to carrier disc 93 which, in the illustrated example, has the shape of a pot and by whose aperture window 95 the emitting and receiving lobe is narrowed.

FIG. 11b shows a top view of the transducer illustrated in FIG. 11a, with attached absorber disc 93 and aperture window 95.

List of Reference Numerals

1. Start-stop-counter
2. receiver
3. separation stage
4. US-transmitter-receiver-transducer
5. output of h-f generator
6. first gate
7. second NAND-gate
8. input of third NAND-gate
9. circuit arrangement
10. decoder
11. digital indicator
12. second decoder
13. pre-selection switch 14. driver
15. acoustic indicator device
16. storage
17. optical indicator
18. third decoder
19. input switch
20. driver
21. indicator lamp 1
22. indicator lamp 2
23. synchronous conductor
24. distance measuring A
25. distance measuring device B
26. central unit
27. digital indicator with operating elements
28. drive speed adapter at vehicle transmission
29. vehicle battery
30a+b. wide beam sensor
31. sensor with double deflection
32. passage height measuring sensor
33. loading ramp
34. wide beam concave mirror sensor
35a+b. near measuring sensors
36. ultrasonic detector
37. emitting and receiving membrane
38. connecting lines
39. pot-shaped housing
40. mounting pin
41. non-parallel disc
42. perpendicular connection face
43. holder
44. center axis of the system
45. emitting and receiving lobe
46. rim
47. vertical angle of aperture
48. horizontal angle of aperture
49. development contour
50. section of the mantle of cylindrical housing
51. cylindrical synthetic resin housing
52. funnel
53. effective length
54. diameter of the aperture
55. parallel reflected sound waves
56. obliquely impinging sound waves
57. inner wall of the funnel
58. closing cover
59. electromagnet or pneumatic actuation
60. quarter-spherical reflector
61. housing attachment
62. center point of reflector
63. direction of flaring out
64. energy-rich core of the flaring lobe
65. clamping holder
66. box
67. front reflection face
68. rear reflection face
69. mounting flange
70. elongated slot
71. funnel angle
72. vertical angle of front reflection face
73. vertical angle of rear reflection face
74. mirror spacing detector front mirror
75. mirror spacing of front to rear mirror
76. horizontal angle of front reflection face
77. horizontal angle of rear reflection face
78. vertical exit angle
79. horizontal exit angle
80. beam path vertical impingement
81. beam path small angle of impingement
82. beam path larger angle of impingement
83. synthetic resin box
84. receptacle for detector
85. funnel-shaped aperture
86. holder
87. large convex mirror
88. housing cover
89. holder
90. small convex mirror
91. inlet window
92. aperture
93. carrier disc
94. absorber disc
95. aperture window
96. mounting holes
97. dove-tail plug-in connection

I claim:

1. A circuit for measuring and indicating the separation distance between a vehicle and adjacent obstacles, comprising;
    pulse controlled ultrasonic generator,
    ultrasonic transmit-receive transducer connected to said generator for transmitting direct ultrasonic pulse signals to the obstacles, and wherein the ultrasonic signals reflected by the obstacles are received by said transducer;
    an amplifier and detector circuit coupled to said transducer output for receiving and detecting both transmitted and received pulse signals;
    a first comparator coupled to the output of said amplifier and detector circuit,
    a start-stop counter coupled to the output of said first comparator for measuring the difference in time between the end of the transmitted ultrasonic signal, and the reception of the reflected signal from the obstacle;
    a noise suppression circuit coupled to the output of said first comparator;
    a second comparator coupled to both the output of said noise suppression circuit and the output of said start-stop counter;
    wherein said start-stop counter begins the measurement time used for determining the separation distance at the corresponding end of the direct transmitted pulse signal appearing in said receiver circuit.

2. The circuit according to claim 1, wherein said ultrasonic generator comprises a first multivibrator having a pulse width to pulse repetition ratio of 1:60 for producing pulses of 1 millisecond pulse width to 60 millisecond repetition, a second astable multivibrator coupled to the output of said first multivibrator for generating the pulses for said ultrasonic transducer, a terminal stage coupled to said ultrasonic generator, and fed by said second multivibrator, a band pass amplifier connected to said terminal stage for receiving the reflected signals, a second detector coupled to said band pass amplifier and said first comparitor is coupled to said second detector so that said second comparator stage, coupled through said noise suppression stage and said first comparator generates a measurement window having an adjustable time between 0.1 millisecond to 15 millisecond, and wherein the start of the measurement window is generated by a flip-flop controlled by the trailing edge of the transmitted signal on the transducer, and which is reset at the end of transmitted signal by the synchronizing pulse.

3. The circuit according to claim 2, comprising an adjustable two stage potentiometer coupled to said counter for setting the distances to be measured by changing the measurement time in two stages, independently of each other, wherein the first stage is adjusted for large distances when the vehicle is set to travel backwards, while the second stage for setting vernier distance is only activated, if the preliminary warning signal of the first stage is transmitted for several seconds.

4. The circuit according to claim 3 comprising a sensor housing for including said second astable multivibrator for generation of the ultrasonic generator frequency, together with said termination stage, said band pass amplifier, and said detector.

5. The circuit according to claim 4 additionally comprising measurement and adjustment circuits coupled to said start stop counter, for measuring through passage height, said measurement and adjustment circuits being connected to a stop input of a separation stage through said receiver controlling said ultrasonic transducer, and wherein the controllable input of the separation stage, as well as the start and timing input of said counter is connected through a gate and frequency divider circuit to the H.F. generator for generation of the control, start and timing signals.

6. The circuit according to claim 5, comprising a further decoder having a preselection switch for setting a minimal height, said switch being coupled to said counter, a driver having its input coupled to said counter, an accoustic indicator circuit coupled to said driver, and a memory, circuit coupled to said driver, and a digital indicator coupled to said driver for providing a digital indication to the distances measured.

7. The circuit according to claim 1, additionally comprising an optical indicator coupled to said digital start/stop frequency counter for providing an optical indication of the distance measured.

8. The circuit according to claim 1, wherein said ultrasonic transducer includes a transmitting and receiving membrane, said transducer having its electrical connections disposed in a pot-shaped housing of weather resistant material, a lip disposed along the lower portion of said transducer housing for vertically raising the transmitting and receiving signals of said transducer.

9. The circuit according to claim 8 wherein said transducer includes an absorber disk disposed on said membrane a carrier disk formed as a pod, and surrounding said transducer and supporting said absorbing disk, said carrier disk including a narrowed transmitting and receiving window so that the transmit and receive signal lobes are narrowed through said window of said carrier disk.

* * * * *